March 27, 1934. R. J. SMITH ET AL 1,952,570
HYDRAULIC TRANSMISSION GEAR
Filed Dec. 5, 1932 3 Sheets-Sheet 3

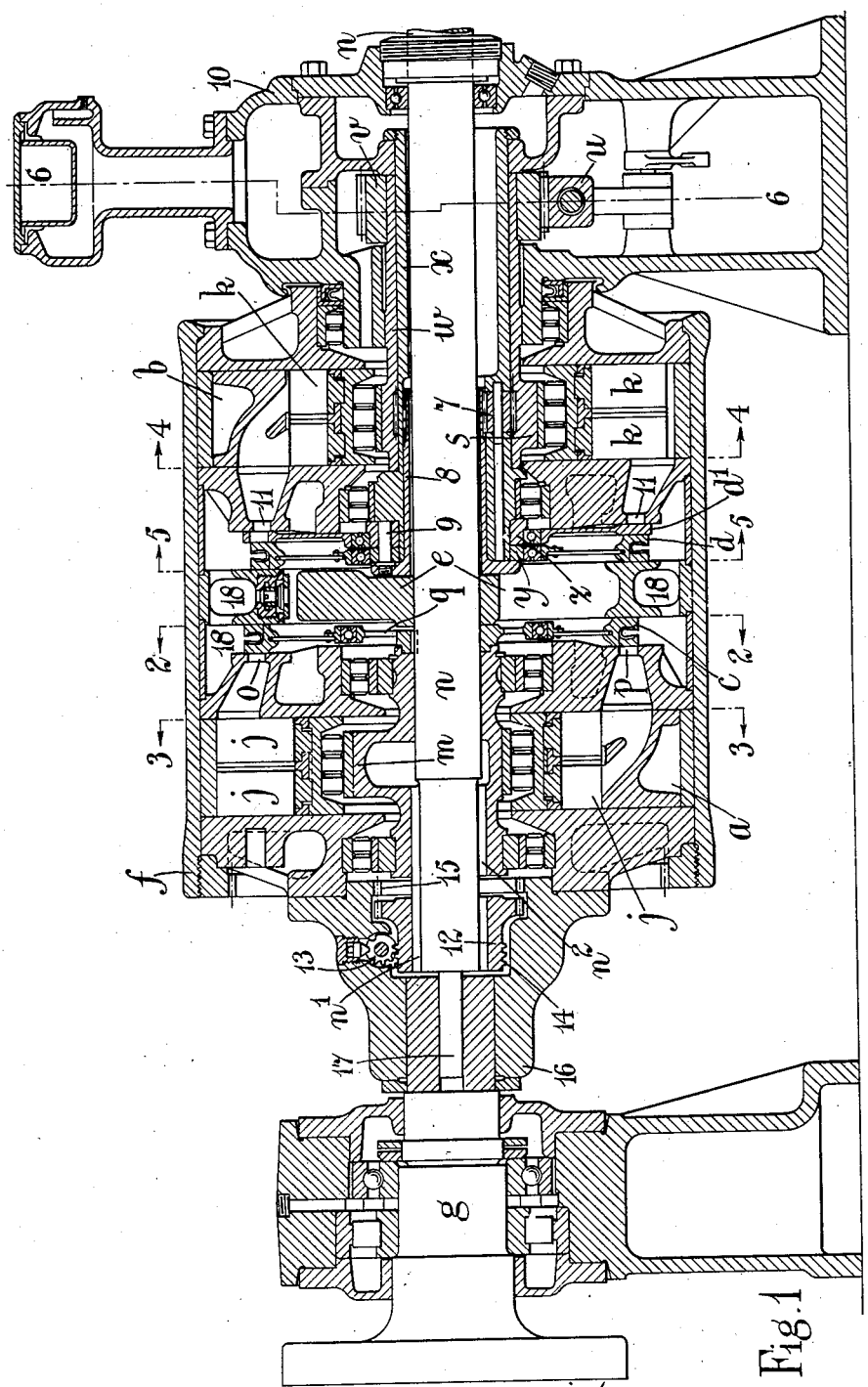

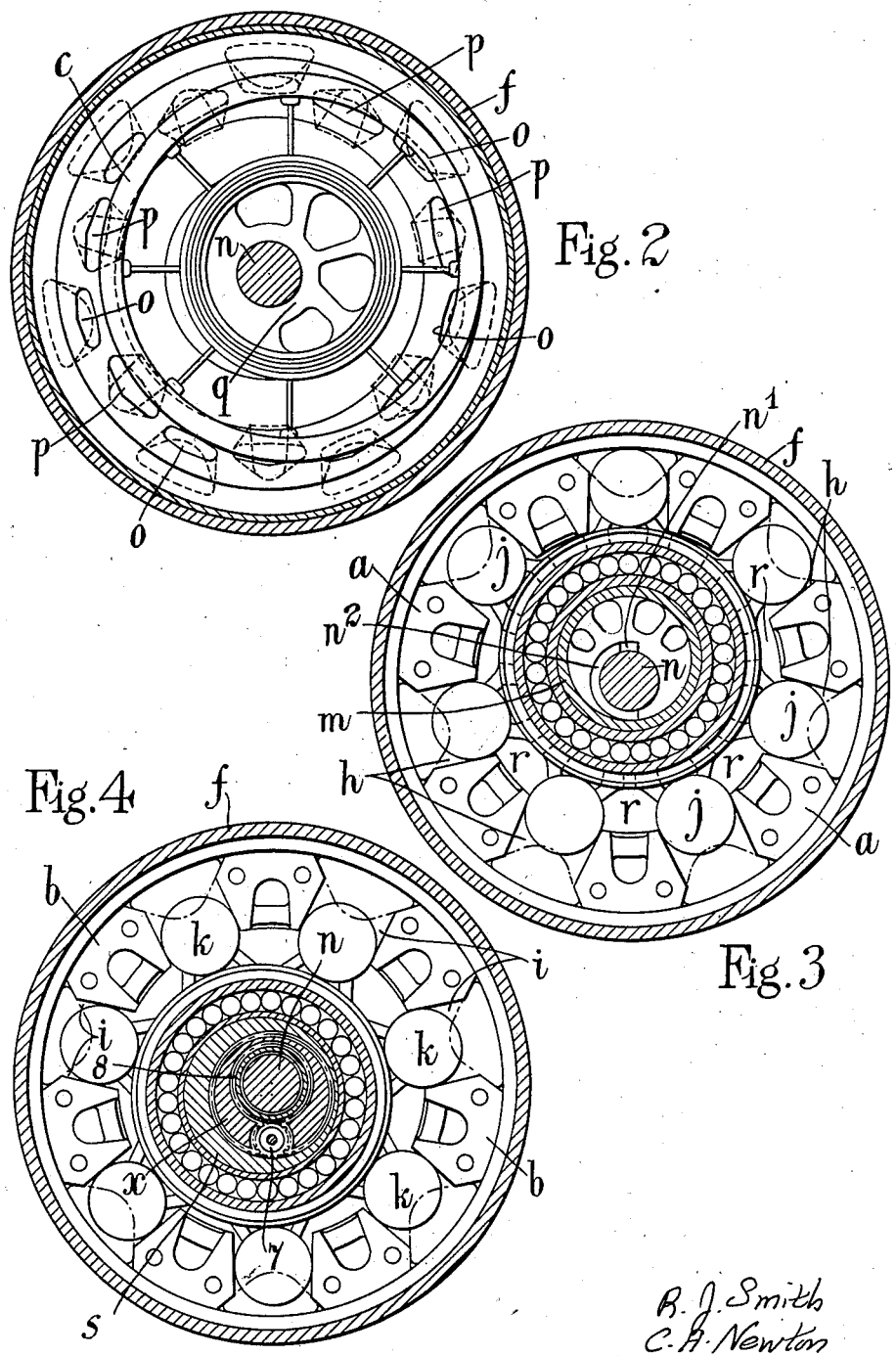

R. J. Smith
C. A. Newton
R. C. Roe INVENTORS

By Marks & Clerk
ATTYS

Patented Mar. 27, 1934

1,952,570

UNITED STATES PATENT OFFICE 1,952,570

HYDRAULIC TRANSMISSION GEAR

Ralph John Smith and Charles Andrew Newton, Littleover, and Reginald Claude Roe, Rochdale, England Application December 5, 1932, Serial No. 645,788
In Great Britain December 10, 1931

3 Claims. (Cl. 60—53)

In the specification of Patent No. 1,914,622 there is described a hydraulic transmission gear comprising pumps and motors made up of rollers running on eccentric rings and working in radial pockets in a casing, the passage of liquid to and from the pockets and to and from the spaces or divisions around the eccentric rings being governed by valve rings operated by crank pins or the like.

The object of the present invention is to provide an improved transmission gear which can take the place of the flywheel, clutch and change speed gear of a motor vehicle or like transmission, and which can be of approximately the same weight as the parts which it replaces.

In accordance with the invention, a housing is provided which is rotated by the engine, motor or like driving member, and which has in it two units comprising rollers running on eccentric rings and working in radial pockets, as in the prior specification. One unit, corresponding to the pumping unit of the prior specification, will be called the clutch or driving unit, and the other unit the torque increasing unit. The clutch unit has an eccentric of fixed throw secured to the driven shaft, whilst the torque increasing unit has a non-rotatable eccentric of adjustable throw. The valve ring of the clutch unit has a fixed degree of eccentricity and rotates with the driven shaft, whilst the valve ring of the torque increasing unit has its eccentricity varied simultaneously with the eccentricity of the eccentric of the said unit. The pressure fluid can circulate between the respective pockets and spaces round the eccentrics under the control of the valve rings, as in the prior specification previously referred to, but the casings containing the pockets of the two units rotate together at all times, being driven by the prime mover.

Referring to the accompanying sheets of explanatory drawings:—

Figure 1 is a longitudinal section of a hydraulic transmission gear constructed in one convenient form in accordance with this invention.

Figure 2 is a cross section on the line 2—2 of Figure 1.

Figure 3 is a cross sectional elevation on the line 3—3 of Figure 1.

Figure 4 is a cross section on the line 4—4 of Figure 1.

In the figures, $a$ indicates the clutch or driving unit and $b$ the torque increasing unit. Such units have distributing valves $c$ and $d$ respectively associated therewith as in the prior specification before referred to and there is a central separating ring $e$ between the two units through which the oil circulating between the units passes.

The housing $f$ of the complete unit is driven by the driving shaft $g$ so that the casings $a$ and $b$ (in which are the pockets $h$, $i$, in which the rollers or roller type pistons $j$, $k$, work) rotate always at the same rate. The eccentric $m$ which causes the reciprocation of the rollers of the clutch unit is of fixed throw and drives the shaft $n$.

There is a key like projection $n^1$ on the shaft $n$ which enters a recess $n^2$ extending through an angle of 180° around the shaft. The key $n^1$ is in engagement with one or other end of the recess $n^2$ according to the direction of rotation of the shaft $n$. This provides for an angular movement of the eccentric $m$ through an angle of 180° with relation to the driven shaft $n$.

The distributing valve plate $c$ of the clutch unit is moved across the ports $o$, $p$, leading to the pockets $h$ and to the divisions $r$ (around the eccentric) between the rollers $j$ respectively, by the fixed throw eccentric $q$ secured to the shaft $n$.

The eccentric $s$ of the torque increasing unit is of variable throw, the throw adjustment being effected by turning the handle $t$ which moves the rack $u$ to turn the toothed ring $v$ and so the sleeve $w$ having an eccentric portion, such sleeve turning upon a fixed eccentric sleeve $x$. The latter has the eccentrics $y$ and $z$ thereon which operate the distributing valve plates $d$ and $d^1$. There is a pinion 7 in gear with internal teeth upon the adjustable eccentric sleeve $w$ and such pinion turns the sleeve 8 which is connected by a stud or studs 9 to the eccentrics $y$ and $z$ so that the latter are adjusted simultaneously with the sleeve $w$.

The eccentric sleeve $x$ is locked to the frame or bolster member 10 as shown. If the throw of the eccentric sleeve $w$ is opposed to that of the fixed eccentric sleeve $x$, the one neutralizes the other and the axis of the sleeve $w$ becomes coaxial with the axis of the housing $f$ and shaft $n$. If the eccentric sleeve $w$ is adjusted so that its throw is added to that of the fixed sleeve $x$, then the total eccentricity is the maximum.

Figure 5:
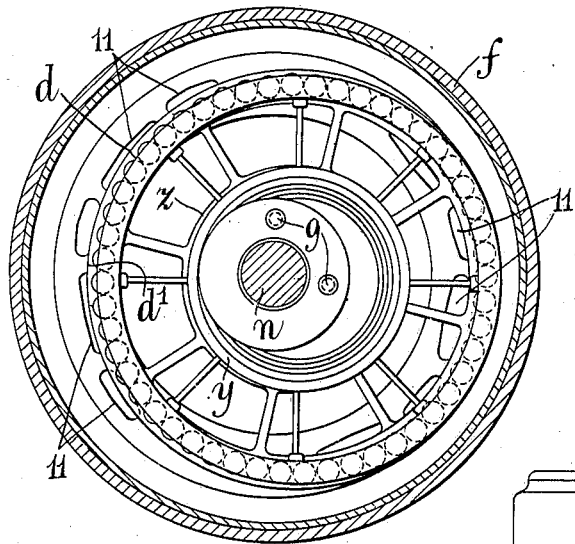
Figure 5 is a cross section on the line 5—5 of Figure 1.
Figure 6:
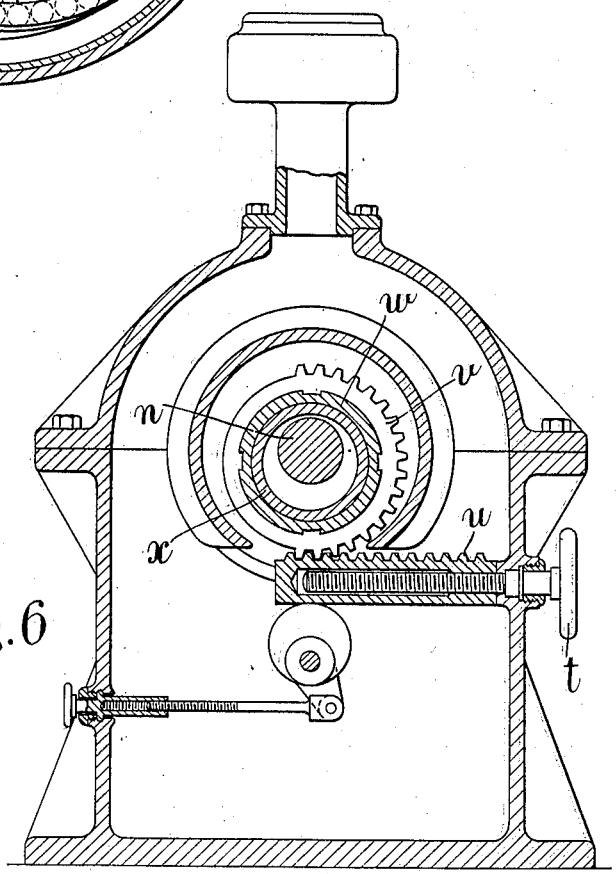
Figure 6 is a sectional end elevation on the line 6—6 of Figure 1.

The distributing ports of the torque unit are shown at 11 in Figure 5. Such ports are spaced in two circles of different diameters and are controlled by the two valve discs $d$ and $d^1$. When the eccentrics $w$ and $x$ neutralize one another, the valve discs or plates $d$ and $d^1$ are in a position to seal or close the ports 11 so that there is no circulation of liquid between the units $a$ and $b$.

The shaft $n$ can be directly coupled to the driving shaft $g$ by means of the coupling piece 12 splined upon the shaft $n$ and movable by the pinion 13 and circular rack 14 into engagement with internal teeth 15 on the part 16 keyed to the driving shaft. The driven shaft $n$ has an extension 17 which projects into the shaft $g$ so that the latter forms a bearing therefor.

If the adjustable eccentric $w$ of the torque increasing unit $b$ is in a position in which its throw is equal to the throw of the fixed eccentric $m$ of the clutch unit $a$, and if the capacities of the two units $a$ and $b$ are equal, then if the driven shaft $n$ be stationary, the discharge capacity of the clutch unit $a$ will be equal to the receptive capacity of the torque increasing unit $b$, and the clutch unit $a$ will receive all the fluid delivered by the torque increasing unit $b$, and the torque increasing unit will receive all the fluid delivered by the clutch unit. Under these conditions the clutch unit $a$ will not tend to impart any rotary motion to the driven shaft $n$ through the eccentric $m$. This condition is equivalent to what would occur if the delivery pressure of the torque increasing unit $b$ were released by a relief valve or the like. If, however, the adjustable eccentric $w$ of the torque increasing unit $b$ be adjusted to any other position, then the clutch unit $a$ will impart a driving motion to the driven shaft $n$ through the fixed eccentric $m$. If the adjustable eccentric $w$ of the torque increasing unit be concentric with the driven shaft $n$, the valve $d$, $d^1$ of such unit being then in a position in which it closes all the ports leading to the fluid spaces of the torque increasing unit, then the fluid within the clutch unit $a$ will be confined therein and the rotation of the housing $f$ by the prime mover or shaft $g$ will result in the driven shaft $n$ being rotated at the same speed as the prime mover or shaft $g$. If now the adjustable eccentric $w$ be moved through the neutral concentric position before referred to, towards a position of maximum throw, then the torque increasing unit will boost or increase the oil pressure in the clutch unit, and so cause such unit to rotate the driven shaft $n$ at a higher speed than the housing $f$ driven by the prime mover or shaft $g$.

The fixed eccentric $m$ of the clutch unit preferably rotates the driven shaft through the key $n^1$ as before described which can move in the recess $n^2$ in the eccentric through an angle of 180°, so that if the driven shaft $n$ tends to overrun the clutch unit $a$, there will be a relative movement of 180° between the shaft $n$ and such unit before the shaft tends to rotate such unit in a similar direction, or to accelerate the movement of such unit. The movement of the eccentric through an angle of 180° with relation to the eccentricity of the valve ring $c$ of the clutch unit ensures that the pressure set up by the over-running of the driven shaft tends to rotate the housing $f$ (which is being driven by the shaft $g$) in the direction of the shaft $g$, so that the said shaft is being speeded up and so can act as a brake in the known manner. This arrangement ensures that one zone (as 18) of the hydraulic system is continuously under pressure whether the driven shaft is being rotated by the clutch unit or is tending to overrun the latter.

If desired, means such as a relief valve or the like may be provided for releasing the pressure in the pressure zone 18 of the complete system, to the suction zone surrounded by the pressure zone so as to allow the driven shaft to be free from the driving effort of the prime mover.

The details of construction of the rollers and of the plate or ring type valves have not been described nor their operation set out in detail as this information will be found in the prior specification No. 1,914,622 before referred to.

What we claim is:

1. In a hydraulic transmission gear, the combination of a housing driven from a prime mover, a driven shaft located axially within said housing, two separate casings having radial pockets therein and concentrically mounted within said housing for rotation therewith, rollers located within said radial pockets, which latter are provided with ports, a nonrotative eccentric of variable throw mounted freely upon said driven shaft in radial alignment with one of said casings, means constraining the rollers in the radial pockets of said casing to remain continuously in rolling contact with said non-rotative eccentric, the space between which and said casing is divided up by said rollers to form divisions also provided with ports, a fixed throw eccentric keyed upon said driven shaft in radial alignment with the other of said casings, means constraining the rollers in the radial pockets of said other casing to remain continuously in rolling contact with said fixed throw eccentric the space between which and said casing is also divided up by said rollers to form divisions provided with ports, a valve ring keyed to the driven shaft and having a fixed degree of eccentricity corresponding to said fixed throw eccentric, and a valve ring the eccentricity of which is varied simultaneously with the eccentricity of said eccentric of variable throw, said valve rings and said ports over which they slide constituting fluid distribution means controlling the fluid flow to and from said pockets and said divisions.

2. In a hydraulic transmission gear, the combination of a housing driven from a prime mover, a driven shaft located axially within said housing, two separate casings having radial pockets therein and concentrically mounted within said housing for rotation therewith, rollers located within said radial pockets which latter are provided with ports, a nonrotative eccentric of variable throw mounted freely upon said driven shaft in radial alignment with one of said casings, means constraining the rollers in the radial pockets of said casing to remain continuously in rolling contact with said non-rotative eccentric the space between which and said casing is divided up by said rollers to form divisions also provided with ports, a fixed throw eccentric upon said driven shaft in radial alignment with the other of said casings, a key and semicircular slot connection between said fixed throw eccentric and said driven shaft whereby the latter can move through an angle of 180° relatively to said fixed throw eccentric when said driven shaft tends to overrun fixed throw eccentricity, means constraining the rollers in the radial pockets of said other casing to remain continuously in rolling contact with said fixed throw eccentric, the space between which and said casing is also divided up by said rollers to form divisions provided with ports, a valve ring keyed to the driven shaft and having a fixed degree of eccentricity corresponding to said fixed throw eccentric, said valve ring moving with said driven shaft relatively to said fixed throw eccentric when said driven shaft tends to overrun said fixed throw eccentric, and a valve ring the eccentricity of which is varied simultaneously with the eccentricity of said eccentric of variable throw, said valve rings and said ports over which they slide constituting fluid distribution means controlling the fluid flow to and from said pockets and said divisions.

3. In a hydraulic transmission gear, the combination of a housing driven from a prime mover, a driven shaft located axially within said housing, two separate casings having radial pockets therein and concentrically mounted within said housing for rotation therewith, rollers located within said radial pockets, which latter are provided with ports, a nonrotative eccentric of variable throw mounted freely upon said driven shaft in radial alignment with one of said casings, means constraining the rollers in the radial pockets of said casing to remain continuously in rolling contact with said non-rotative eccentric the space between which and said casing is divided up by said rollers to form divisions also provided with ports, a fixed throw eccentric keyed upon said driven shaft in radial alignment with the other of said casings, means constraining the rollers in the radial pockets of said other casing to remain continuously in rolling contact with said fixed throw eccentric the space between which said casing is also divided up by said rollers to form divisions provided with ports, a valve ring keyed to the driven shaft and having a fixed degree of eccentricity corresponding to said fixed throw eccentric, a fixed eccentric sleeve upon which said variable throw eccentric is adjustable, internal teeth upon said variable throw eccentric, a pinion carried by said fixed eccentric sleeve, a further sleeve toothed to mesh with said pinion, and a second valve ring secured to said further sleeve so that rotary adjustment of said variable throw eccentric rotates said pinion to rotate said further sleeve and consequently rotates said second valve ring to vary its eccentricity simultaneously with that of said variable throw eccentric, said valve rings and said ports over which they slide constituting fluid distribution means controlling the fluid flow to and from said pockets and said divisions.

RALPH JOHN SMITH.
CHARLES ANDREW NEWTON.
REGINALD CLAUDE ROE.